US012773801B2

(12) United States Patent
Piesker et al.

(10) Patent No.: US 12,773,801 B2
(45) Date of Patent: Oct. 27, 2026

(54) ELECTRIC HAIR REMOVAL DEVICE, A KIT AND AN ATTACHMENT

(71) Applicant: Braun GmbH, Kronberg (DE)

(72) Inventors: Thorsten Piesker, Friedrichsdorf (DE); Renata Burghardt, Kronberg (DE); Astrid Mex, Glashuetten (DE); Xiaolan Xu, Oberursel (DE)

(73) Assignee: Braun GmbH, Kronberg (DE)

( * ) Notice: Subject to any disclaimer, the term of this patent is extended or adjusted under 35 U.S.C. 154(b) by 406 days.

(21) Appl. No.: 18/239,779

(22) Filed: Aug. 30, 2023

(65) Prior Publication Data

US 2024/0066731 A1 Feb. 29, 2024

(30) Foreign Application Priority Data

Aug. 30, 2022 (EP) .................................... 22192868

(51) Int. Cl.

*B26B 19/38* (2006.01)
*A45D 26/00* (2006.01)
*A45D 27/00* (2006.01)
*B26B 19/28* (2006.01)

(52) U.S. Cl.

CPC ...... *B26B 19/3813* (2013.01); *A45D 26/0028* (2013.01); *A45D 27/00* (2013.01); *B26B 19/282* (2013.01); *B26B 19/386* (2013.01); *A45D 2200/25* (2013.01)

(58) Field of Classification Search

CPC . B26B 19/3813; B26B 19/282; B26B 19/386; A45D 26/0028; A45D 27/00
See application file for complete search history.

(56) References Cited

U.S. PATENT DOCUMENTS 5,193,275 A 3/1993 Hirokazu et al.
5,632,087 A * 5/1997 Motohashi ............ B26B 19/282 30/43.92
6,123,713 A * 9/2000 Yiu .................... A45D 26/0028 425/71

(Continued)

FOREIGN PATENT DOCUMENTS

DE 946778 C 9/1956
EP 2433520 A1 3/2012

(Continued)

OTHER PUBLICATIONS

EPO Search Report and Search Opinion for 22192868.2 dated Jan. 30, 2023; 8 Pages.

(Continued)

*Primary Examiner* — Erin McGrath
(74) *Attorney, Agent, or Firm* — Gerd Zetterer

(57) ABSTRACT

The present invention relates to an electric hair removal device, in particular an electric shaver or a hair trimmer or a hair epilator, comprising a handle and a head, said head comprising a head base, a first attachment for skin treatment, said first attachment being releasably connectable with said head base, and a second attachment having a hair removal tool, said first attachment being releasably connectable with said head base, wherein a motor output drive is moveable and non-operatively coupled within an inner head space of a joint head housing of said head base and said first attachment for generating head housing vibrations.

17 Claims, 5 Drawing Sheets

(56) References Cited

U.S. PATENT DOCUMENTS

| | | | | |
|---|---|---|---|---|
| 2003/0073949 | A1* | 4/2003 | Giammarusti | A61M 31/002 604/20 |
| 2006/0047234 | A1* | 3/2006 | Glucksman | A61B 17/54 601/87 |
| 2007/0283565 | A1 | 12/2007 | Ho | |
| 2013/0274762 | A1* | 10/2013 | Guay | A45D 44/22 206/581 |
| 2014/0142472 | A1* | 5/2014 | Giraud | A61H 15/02 601/84 |
| 2017/0106809 | A1* | 4/2017 | Tirrell | F16B 1/00 |
| 2018/0085949 | A1* | 3/2018 | Krauss | B26B 19/386 |
| 2020/0280680 | A1* | 9/2020 | Nichols | A61B 5/0013 |
| 2021/0401663 | A1* | 12/2021 | Wersland | A61N 5/0616 |
| 2022/0168175 | A1* | 6/2022 | Tang | H01B 7/22 |
| 2022/0175611 | A1* | 6/2022 | Lee | A61H 23/006 |

FOREIGN PATENT DOCUMENTS

| | | | |
|---|---|---|---|
| EP | 3300846 | A1 | 4/2018 |
| JP | H0482587 | A | 3/1992 |
| JP | 2015077204 | A | 4/2015 |
| WO | 2009104124 | A2 | 8/2009 |

OTHER PUBLICATIONS

Extended EPO Search Report and Search Opinion for 23194196.4 dated Dec. 18, 2023; 10 Pages.

* cited by examiner

ELECTRIC HAIR REMOVAL DEVICE, A KIT AND AN ATTACHMENT

FIELD OF THE INVENTION

The present invention relates to an electric hair removal device, in particular an electric shaver or a hair trimmer or a hair epilator, comprising a handle and a head, said head comprising a head base, a first attachment for skin treatment, said first attachment being releasably connectable with said head base, a second attachment having a hair removal tool, said second attachment being releasably connectable with said head base, said head base and one of the first and the second attachment forming a joint head housing, said head housing surrounding an inner head space, a motor provided within said handle being connected with a drive train, said drive train extending into said head and having an output drive, said output drive being releasably connectable with said hair removal tool for driving said hair removal tool of said second attachment. The present invention also relates to a kit and a first attachment for a head of an electric hair removal device.

BACKGROUND OF THE INVENTION

Electric shavers are usually provided with a battery for driving a motor. A drive train connects the motor drive with one more lower blade's which are part of one or more cutting units. Said cutting units each comprise an upper blade having a pattern of e.g. hexagonal openings for catching hair therethrough and a lower blade which move against the upper blade in order to cut the captured hairs.

There are separate skin treatment device's known which are provided with a handle and a motor for driving an eccentric mass, so that a skin treatment surface having e.g. bristles of said device is vibrating. It is desirable to enhance the capabilities of an electric shaver or another hair removal device for skin treatment purposes of the (face) skin.

SUMMARY OF THE INVENTION

It is an object to provide an improved electric hair removal device, kit or head for an electric hair removal device for allowing said hair removal device to be used for skin treatment.

It is a further object to provide such a device or kit allowing the head to be vibrated without a rotating eccentric mass for generating such vibrations.

At least one of the above object is addressed by an electric hair removal device, in particular an electric shaver or a hair trimmer or a hair epilator, comprising a handle and a head, said head comprising a head base, a first attachment for skin treatment, said first attachment being releasably connectable with said head base, a second attachment having a hair removal tool, said second attachment being releasably connectable with said head base, said head base and one of the first and the second attachment forming a joint head housing, said head housing surrounding an inner head space, a motor provided within said handle being connected with a drive train, said drive train extending into said head and having an output drive, said output drive being releasably connectable with said hair removal tool for driving said hair removal tool of said second attachment, wherein said output drive being moveable and non-operatively coupled within said inner head space of said joint head housing of said head base and said first attachment for generating head housing vibrations. Thus, the hair removal device does not require any additional mechanism for generating vibrations if a skin treatment head is coupled with the device's handle. The running motor and drive train used provide sufficient vibrations for passively driving the skin treatment head. Such vibrations allow gliding over the user's skin with reduced friction. Furthermore, the shaving performance may not be negatively impacted by the additional function provided by the skin treatment attachment. A multi useable hair removal device is more sustainable as no additional skin care device is needed. All mechanical and electrical elements needed for a skin treatment device are used by those parts of the hair removal device. In the context of this invention, it is understood that a skin treatment head attachment is not useable for hair cutting and does neither include a foil and other blade parts directly interacting with another moveable blade for cutting hair nor a head attachment portion allowing for cutting or removing hairs. Thus, the skin treatment head attachment is a non-hair cutting attachment or non-hair removal attachment.

According to a further aspect, said head and said handle being connected by a head support frame, said head support frame supporting said head and allowing swivel motion of said head relative to said handle. Swivel head (or maybe additionally combined with further movability e.g. tilting) allows perfect adaption to the users skin.

According to a further aspect, said motor having a motor housing and said head support frame being coupled with said motor housing allowing to transmit motor housing vibrations into said head via said head support frame. Thus, optionally, the motor housing vibrations are a further source for actively causing head vibrations.

According to a further aspect, said motor is of a linear motor type having a motor-electromagnet and a motor-permanent magnet each supported to be moveable substantially linearly back and forth relative to each other. Such smooth linear vibrations were found to be more comfortable onto skin over those caused by an eccentric mass. The single or combined (by active and passive) vibrations cause a head amplitude larger than 0.1 mm but smaller than 1 mm and further optionally a head amplitude ranging between 0.1 mm to 0.5 mm. The combined vibrations may ease cream penetrations and massages the skin.

According to a further aspect, said first attachment is tub or pot shaped having snap fit connections for releasably connecting same with the head base. This allows easy exchange with the shaver attachment and is easy to clean.

According to a further aspect, said first attachment is provided with a magnet. A magnet may be used to utilize a magnetophoretic effect with specific ingredients in a skin cream allowing better skin penetration of active cosmetic cream ingredients.

According to a further aspect, said first attachment is provided with a skin treatment part made from metal and a base part made from plastic, and wherein optionally said skin treatment part is made from stainless steel. A metal cap feels cool onto skin and keeps its smooth surface properties over long life. Moreover, the plastic base part allows still some flexibility for the snap fit connection with the head base but also sufficient flexibility to eliminate gaps between the base part and the treatment part with the liquid glue connecting both. Thus, no dirt may enter the connection between metal and plastic parts.

According to a further aspect, said magnet is sandwiched between said base part and said skin treatment part and wherein optionally said magnet is at least partly or fully surrounded by a glue and further optionally said glue is also sandwiched between said skin treatment part and said base part. This allows a water capsuled arrangement of the magnet.

According to a further aspect, said base part is provided with a recess or indentation for receiving therein said magnet. This allows a water capsuled arrangement of the magnet.

According to a further aspect, said first attachment is provided with ring shaped projections at a skin contact side thereof. This enhances an even cream distribution onto skin.

According to a further aspect, said projections project from said flat skin contact side by 0.1 to 2 mm, or by 0.1 to 1 mm or by 0.1 to 0.5 mm. Such small projections are still found comfortable onto skin (nearly flat) while ensuring better cream distribution onto skin.

According to a further aspect, said skin treatment part is provided with a thickness of less than 1 mm or less than 0.6 mm. This allows good transmission of magnetic flux while assuring sufficient shape stability.

According to a further aspect, a kit of the electric hair removal device is provided in accordance with anyone of the above aspects comprising a skin cream. According to a further aspect, said skin cream is provided with diamagnetic active ingredients which are more permeable to human skin by magnetophoresis.

According to a further aspect, a first attachment for a head of an electric hair removal device, in particular an electric shaver or a hair trimmer or a hair epilator, comprising at least one of the above features is provided.

BRIEF DESCRIPTION OF THE DRAWINGS

The present disclosure will be further elucidated by a detailed description of example embodiments and with reference to figures. In the figures

DETAILED DESCRIPTION OF THE INVENTION

Figure 1:
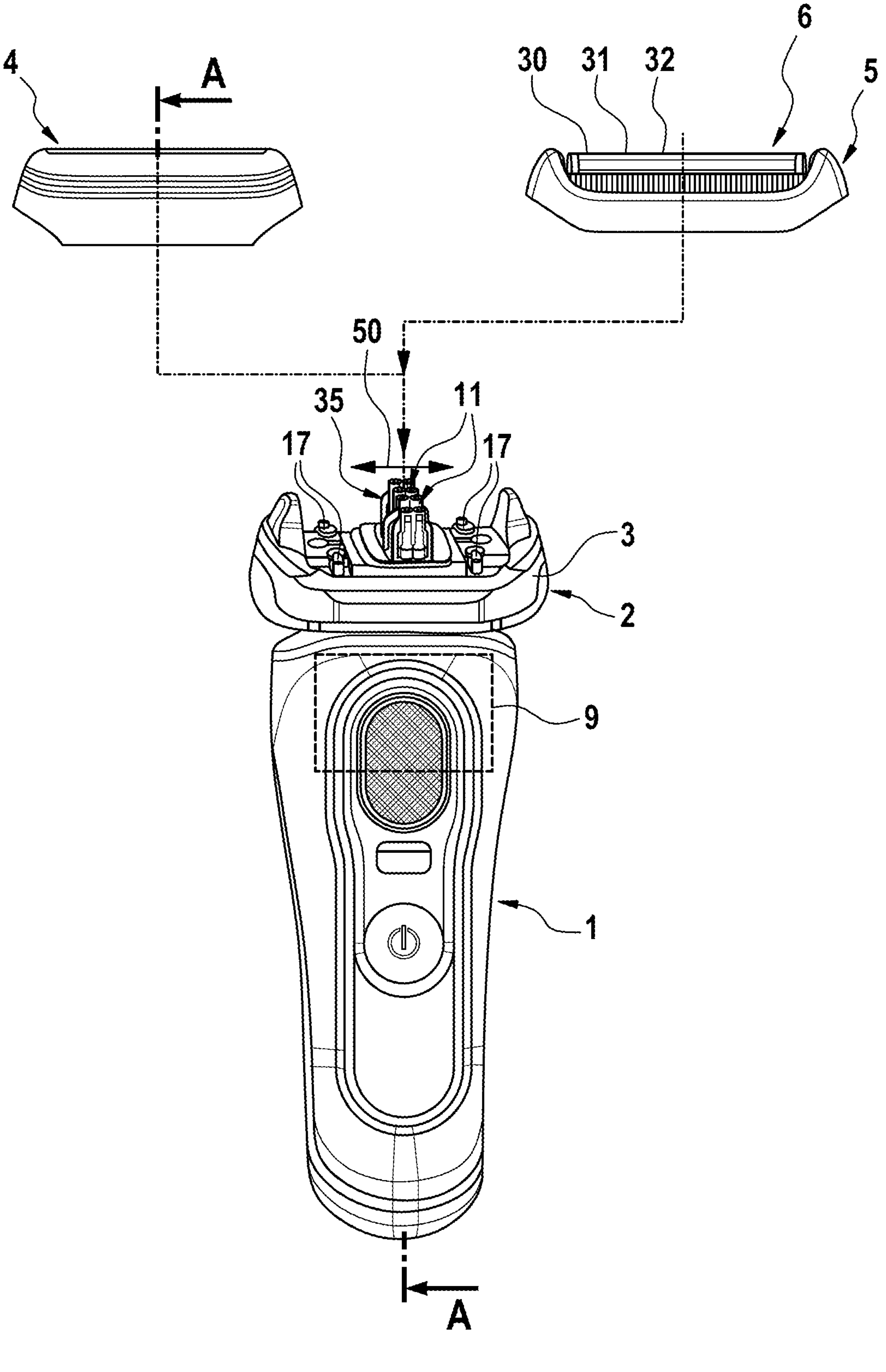
FIG. 1 is a perspective view of an electric shaver with a skin treatment and shaver attachment each detached from the shaver.

FIG. 1 shows an electric hair removal device which is embodied as an electric shaver and two different attachments therefore each not connected with the shaver. Said shaver comprises a shaver handle 1 and a shaver head 2. The shaver head 2 comprises a shaver head base 3 which is connectable with an attachment 4, 5 by a snap fit 17 or other connection. As a first attachment 4 there is provided a skin treatment attachment. As a second attachment 5 there is provided a hair removal tool 6 which comprises several hair cutting units 30, 31, 32. As hair cutting units short hair and/or long hair cutting units may be arranged in the second attachment each comprising a lower, actively driven blade which may linearly oscillate and an upper blade.

The handle 1 of the shaver comprises a motor 9 energized by a battery. The motor is of the rotary or linear type. A drive train 10 couples the motor drive with one or more output drive's 11. The motor 9 of FIG. 1 is of the linear type, so that the output drive's 11 move back and forth along a linear path—see arrow's 50. The linear motor 9 comprises an electromagnet 14 and a permanent magnet 15 moving relative to each other (see FIG. 2). Lower blade connectors 35 are provided at each end of the output drive's 11.

Figure 2:
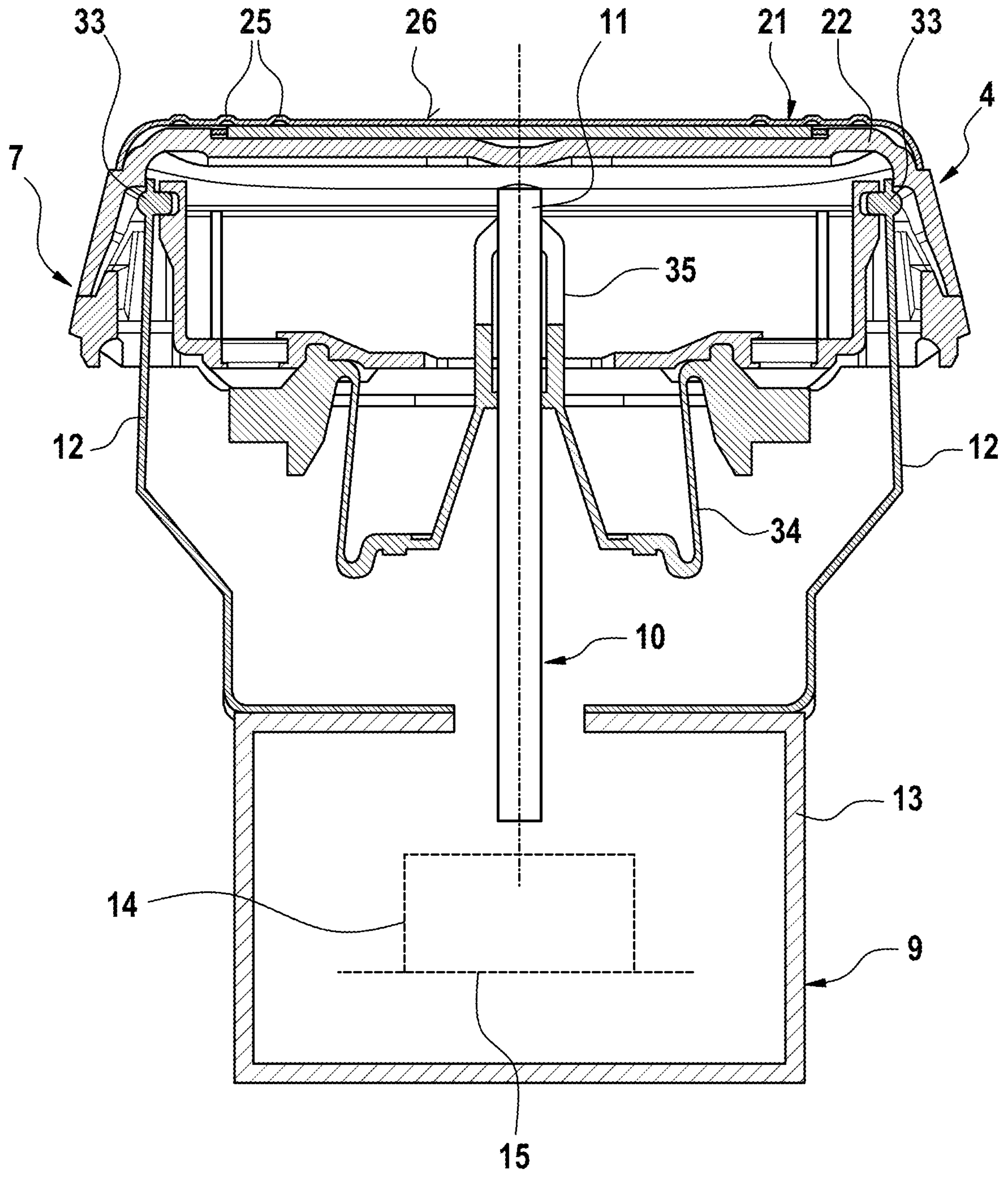
FIG. 2 is a schematic cross-sectional view showing the head with skin treatment attachment coupled with a motor of the shaver of FIG. 1.
Figure 3:
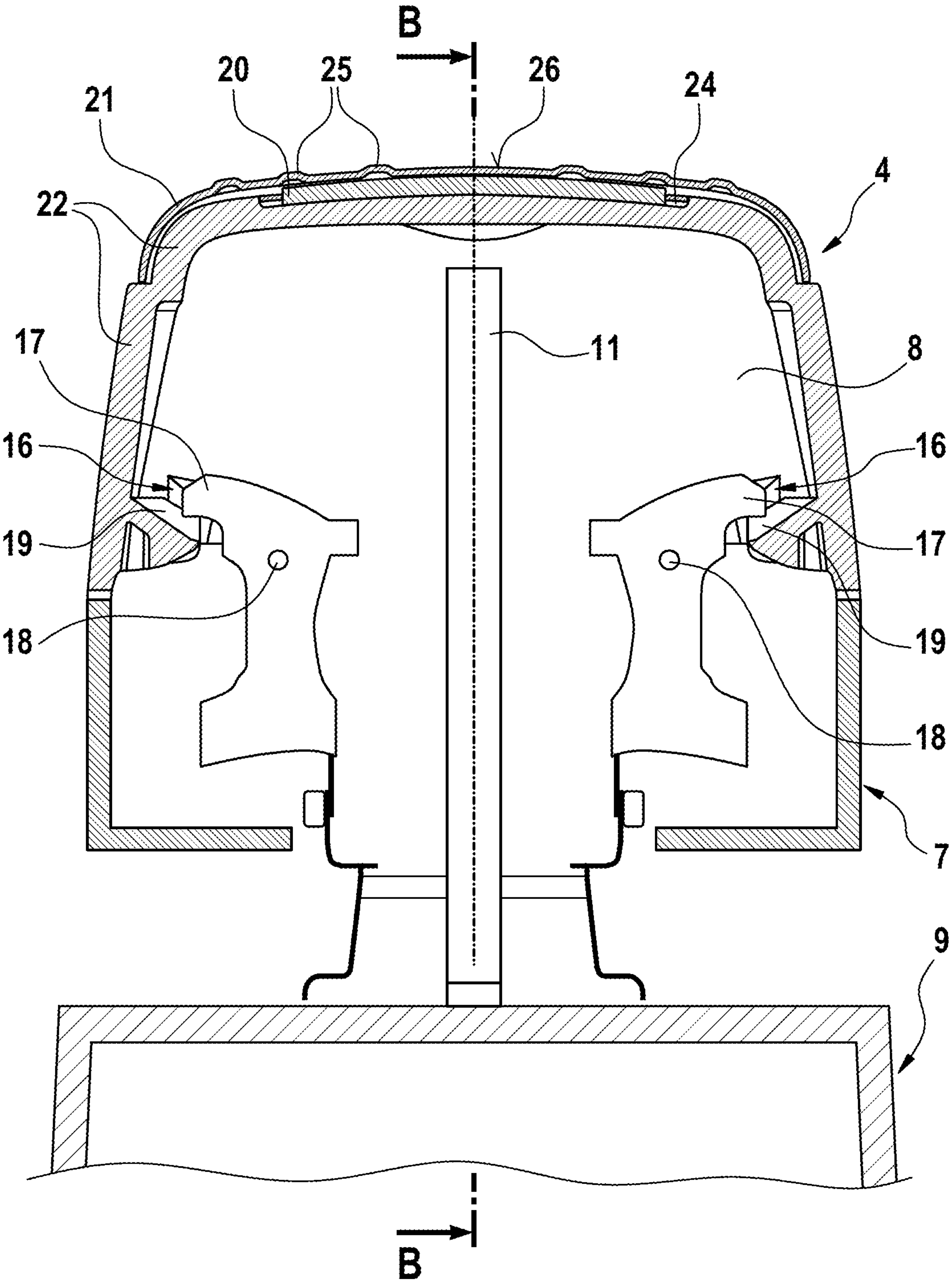
FIG. 3 is a schematic cross-sectional view—90 degree rotated relative to FIG. 2—showing the head with skin treatment attachment coupled with a motor of the shaver of FIG. 1.
Figure 4:
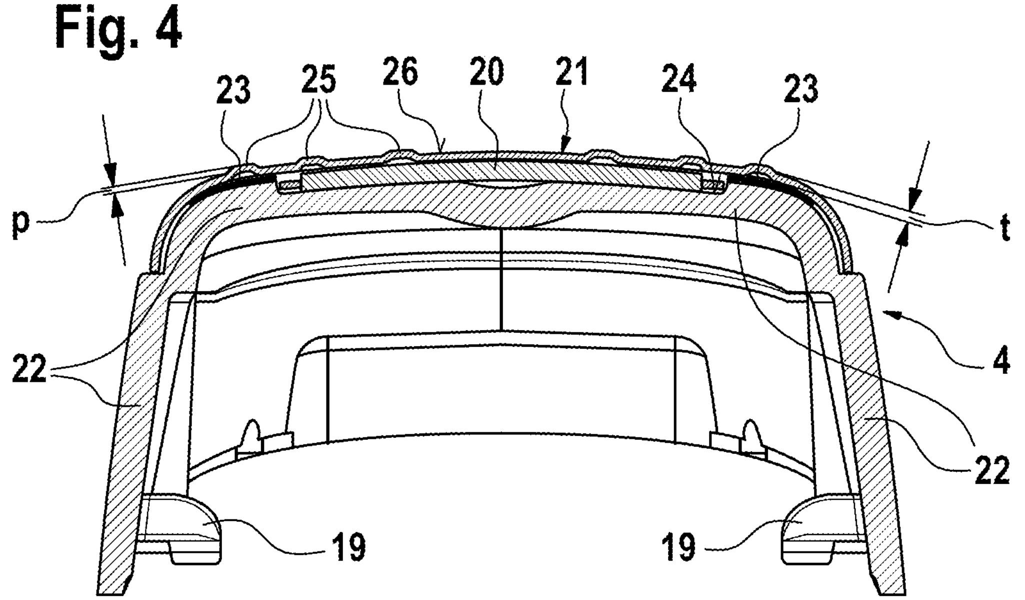
FIG. 4 is a cross section—similar to that of FIG. 3—through the skin treatment attachment for the shaver of FIG. 1.
Figure 5:
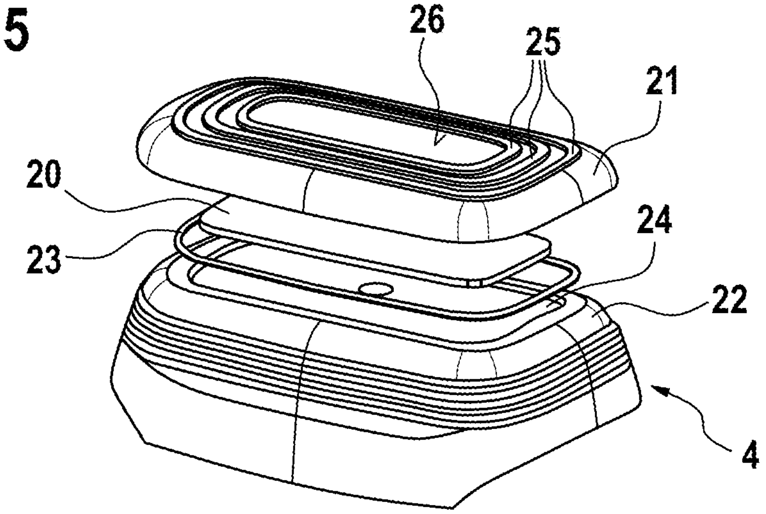
FIG. 5 is a perspective exploded view of the skin treatment attachment for the shaver of FIG. 1.
Figure 6:
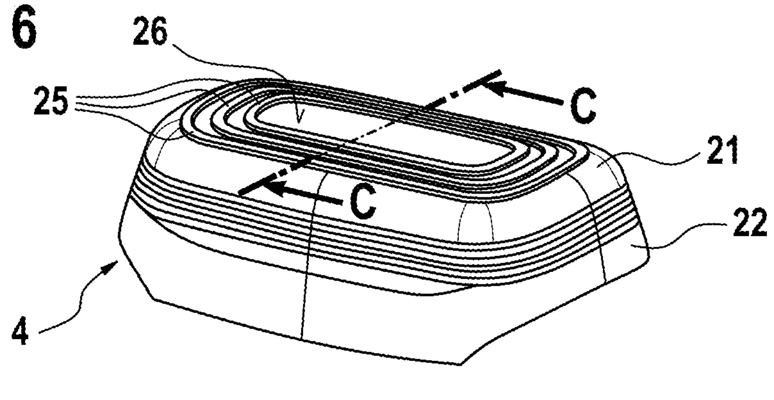
FIG. 6 is a perspective view of the skin treatment attachment for the shaver of FIG. 1.
Figure 7:
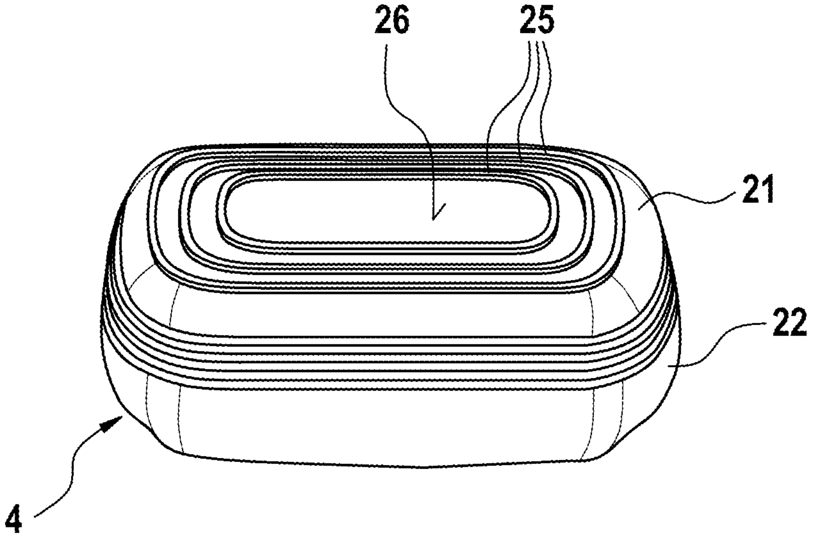
FIG. 7 is a perspective view of the skin treatment attachment for the shaver of FIG. 1

FIG. 2 shows a cross section through the skin treatment head 4 connected with head base 3 along the oscillation direction 50 or along axis B-B of FIG. 3. Schematically illustrated is the motor 9 with drive train 10 coupled to the head 2. The drive train 10 comprises an oscillation bridge—as part of the head 2—linearly guiding the output dive's 11.

A substantially U-shaped head support frame 12 is provided for supporting the head 2 with the handle 1. The lower end of the head support frame 12 is fixedly connected with a housing 13 of the motor 9. The upper ends of the head support frame 12 are pivotably connected with the housing 7 of the head base 3 at pivot supports 33. The pivotal axis is parallel with the oscillation direction 50 of the lower blades.

The motor vibrations are introduced into the head as a further effect of the connection between motor housing 13 and head housing 7 by head support frame 12, so that the head is actively driven with respect to the motor vibrations. Moreover, the skin treatment attachment is also passively vibrating due to the back and forth movement of the output drive 11 with the inner space 8 of the head. At least one of the above or as here shown both sources for generating vibrations in the skin treatment head is provided. The frequency of the vibrations may range between 50 and 300 Hz or optionally between 100 and 200 Hz.

FIG. 3 shows a cross-section through the skin treatment head connected with the head base 3 and a schematic connection with the motor 9 of the handle 1 along axis A-A of FIG. 1 or orthogonal to the oscillation direction along arrows 50. The first attachment 4 comprises one ore more snap fit projections 19 which snap with snap fit hooks 17 which are pivotable around axis 18 and provided on the head base 3, thus forming one or more snap fit connections 16.

The skin treatment attachment 4 may be of any type suitable for treating the skin. It's skin contact surface 26 may be thus provided with hair or rubber bristles or may be a substantially flat surface. The skin treatment attachment illustrated with FIGS. 1-7 is of the type with a substantially flat skin contact surface 26.

As shown in FIGS. 1-7 the skin treatment attachment is provided with a base part 22 made from plastic and a treatment part 21 made from metal and more preferably stainless steel. Both the base part 22 and the treatment part 21 are rectangular in top view (with rounded edges) and substantially tub shaped. Said treatment part 21 lower surface is shaped to fit an upper shape of the base part 22. The base part 22 is provided with a permanent magnet 20 which is embedded in a recess or indentation provided in the outer top surface of the base part 22. As best illustrated with FIGS. 4 and 5 the magnet is surrounded by a rectangular glue ring 23 which allows both fixation of the treatment part onto the magnet the glue and the base part but also provides water sealing of the magnet which is sandwiched between both the base part 22 and the treatment part 21. The treatment part 21 is thus forming a cap onto the base part 22.

Figure 8:
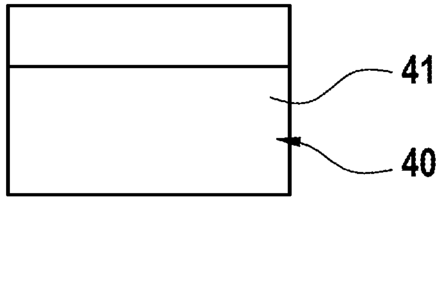
FIG. 8 is a schematic front view on a skin cream for a kit with a shaver of FIG. 1.

The magnet 20 is provided with a magnetic array comprising multiple pole directions and it is optionally a permanent magnet. A kit may comprise a skin cream 40—see FIG. 8—provided with diamagnetic active ingredients which are more permeable to human skin by magnetophoresis interacting with the magnet 20 of the skin treatment attachment 4—see FIGS. 1-7. The magnetic property may be μs<1.3 at the skin contact side 26 adjacent to the magnet 20 and the treatment part 21.

The metal skin treatment part 21 is less than 1 mm, or less than 0.6 mm or around 0.4 mm thick in order to provide a small distance between magnetic array and skin to be treated and thus a maximum effect of the magnetophoretic function with the cream. Accordingly, the penetration of cosmetic ingredients of the cream is enhanced. The treatment part 21 may be coated, galvanized, or lacquered but is preferably not surface treated, uncoated, not galvanized and not lacquered in order to keep the smooth surface property independent from such coating defects which may happen over time.

The skin contact side 26 of the treatment part 21 is further provided with several, preferably 2-5, ring-shaped projections 25 which ring is substantially rectangular with rounded edges. Said projections 25 project from said flat skin contact side (26) by p=0.1 to 2 mm, or by p=0.1 to 1 mm or by p=0.1 to 0.5 mm. The outer rim portion of the treatment part 21 is rounded with a radius of 2 to 10 mm in order to provide a smooth skin feel.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric hair removal device, the electric hair removal device comprising:

a handle and a head coupled with said handle, said head comprising a head base;

a first attachment having a skin treatment part for skin treatment, said first attachment being releasably connectable with said head base to form a first joint head housing surrounding a first inner head space when said first attachment is connected to said head base;

a second attachment interchangeable with said first attachment, said second attachment having a hair removal tool, said second attachment being releasably connectable with said head base to form a second joint head housing surrounding the inner head space when said second attachment is connected to said head base;

a motor provided within said handle, said motor being connected with a drive train, said drive train extending into said head and having an output drive;

wherein, in said second joint head housing said output drive is operatively coupled with said hair removal tool for driving said hair removal tool of said second attachment; and wherein, in said first joint head housing said output drive is moveable and non-operatively coupled within said inner head space of said first attachment and passively generates vibrations of the first joint head housing when the motor is running.

2. The electric hair removal device in accordance with claim 1, wherein said head and said handle are connected by a head support frame, said head support frame supporting said head and allowing swivel motion of said head relative to said handle.

3. The electric hair removal device in accordance with claim 2, wherein said motor is housed in a motor housing and wherein said head support frame is coupled with said motor housing so that motor housing vibrations are transmitted into said head via said head support frame and generate additional vibrations of the first joint head housing.

4. The electric hair removal device in accordance with claim 1, wherein said motor is of a linear motor type having a motor-electromagnet and a motor-permanent magnet each supported to be moveable substantially linearly back and forth relative to each other.

5. The electric hair removal device in accordance with claim 1, wherein said first attachment for skin treatment is tub or pot shaped and comprises snap fit connections for releasably connecting said first attachment with the head base.

6. The electric hair removal device in accordance with claim 1, wherein said first attachment comprises a magnet.

7. The electric hair removal device in accordance with claim 6, wherein said first attachment comprises the skin treatment part made from metal and a base part made from plastic.

8. The electric hair removal device in accordance with claim 7, wherein said magnet is sandwiched between said base part and said skin treatment part.

9. The electric hair removal device in accordance with claim 7, wherein said skin treatment part has a thickness less than 1 mm.

10. The electric hair removal device in accordance with claim 7, wherein the electric hair removal device is an electric shaver, a hair trimmer, or a hair epilator.

11. The electric hair removal device in accordance with claim 6, wherein said base part comprises a recess or indentation, and wherein said magnet is located in said recess or indentation.

12. The electric hair removal device in accordance with claim 1, wherein said first attachment is provided with ring shaped projections at a skin contact side thereof.

13. The electric hair removal device in accordance with claim 12, wherein said projections project from said flat skin contact side by a projection height from 0.1 mm to 2 mm.

14. A kit comprising the electric hair removal device in accordance with claim 1 and a skin cream.

15. The kit of claim 14, wherein:

said first attachment of said electric hair removal device comprises a base part made from plastic, said skin treatment part overlying at least a portion of said base part and made from metal, and a magnet disposed in a recess or indentation of said base part and sandwiched between said base part and said skin treatment part; and said skin cream comprises diamagnetic active ingredients having an increased permeability to human skin by magnetophoresis; and when said first attachment is connected to said electric hair removal device and said skin cream is applied to a human skin surface, said head housing vibrations and said magnet of said electric hair removal device over said skin cream on said human skin surface increase permeability of said skin cream into said human skin surface.

16. An electric hair removal device comprising:

a handle;

a head coupled to said handle, said head comprising a head base;

a motor within said handle;

a drive train operatively coupled to said motor, said drive train extending into said head and having an output drive;

a first attachment for skin treatment, said first attachment releasably connected to said head base to form a first joint head housing surrounding a first inner head space, wherein said first attachment comprises:

a base part having a recess or indentation defined in an outer top surface of said base part;

a skin treatment part overlying at least a portion of said base part, said skin treatment part having a skin contact side facing away from said base part; and a magnet in said recess or indentation and sandwiched between said base part and said skin treatment part, wherein said first attachment is tub or pot shaped and comprises snap fit connections for releasably connecting said first attachment with said head base of said electric hair removal device;

said skin treatment part comprises ring-shaped projections projecting from said skin contact side; and wherein, in said first joint head housing said output drive is moveable and non-operatively coupled within said inner head space of said first attachment to passively generate head housing vibrations when said motor is running.

17. The electric hair removal device in accordance with claim 16, wherein:

said magnet provides a magnetic property us less than 1.3 at the skin contact surface, and said head housing vibrations vibrate said magnet so as to produce a magnetophoretic effect at said skin contact surface.

* * * * *